July 8, 1969　　　J. R. BIPPUS　　　3,453,989
APPARATUS FOR HOLDING ARTICLES
Filed Nov. 13, 1967　　　　　　　　Sheet 1 of 5
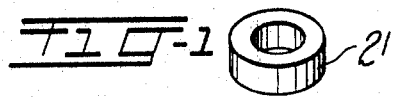
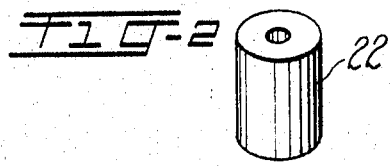
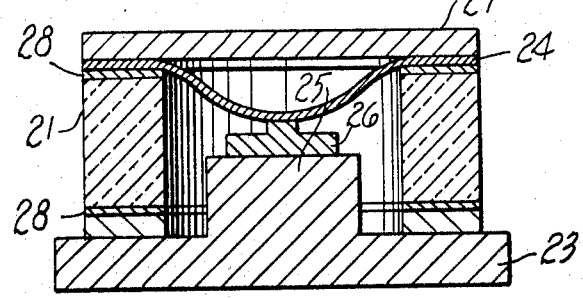
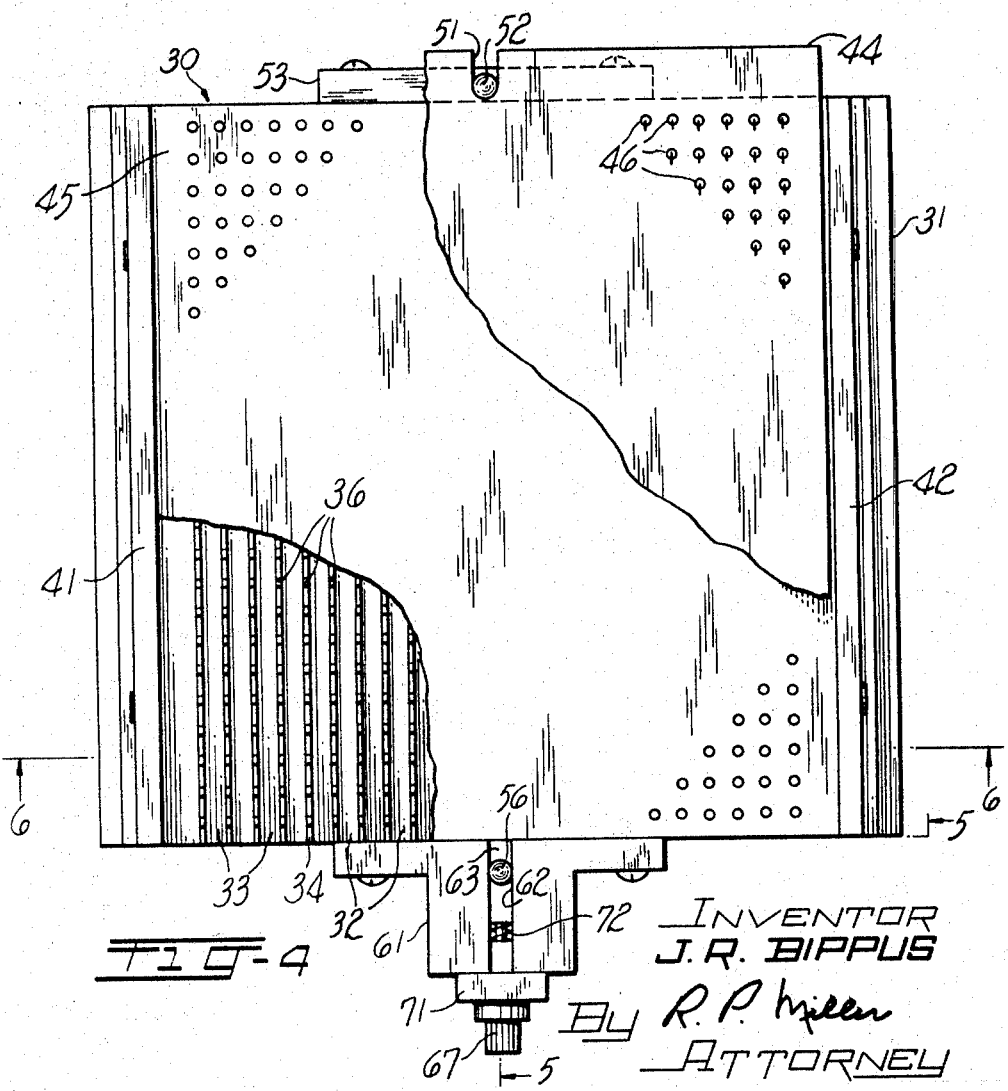
INVENTOR
J. R. BIPPUS
By R. P. Miller
ATTORNEY

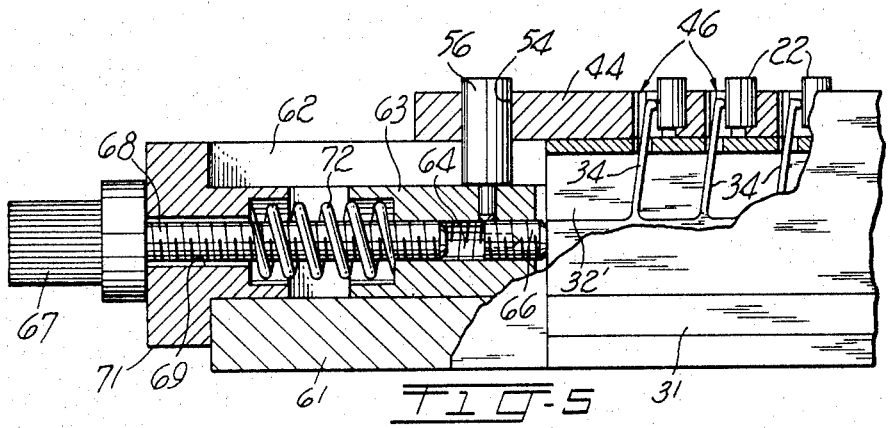
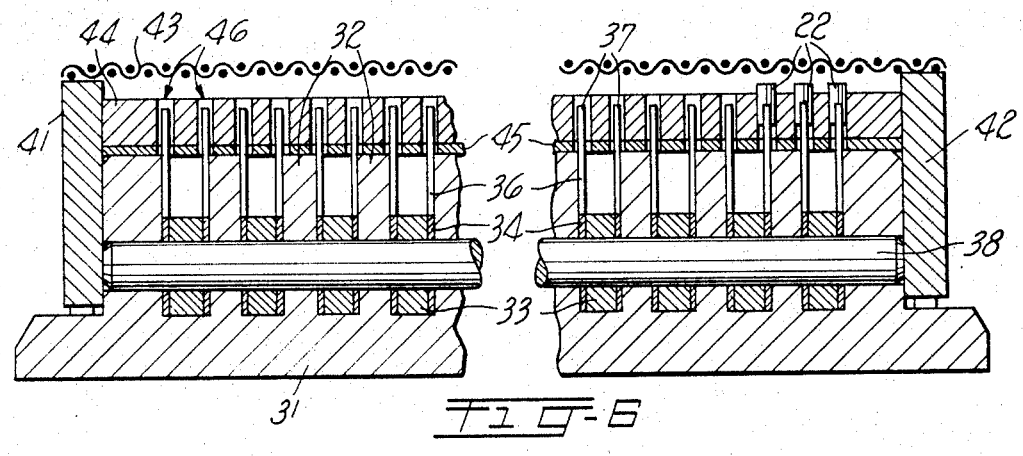
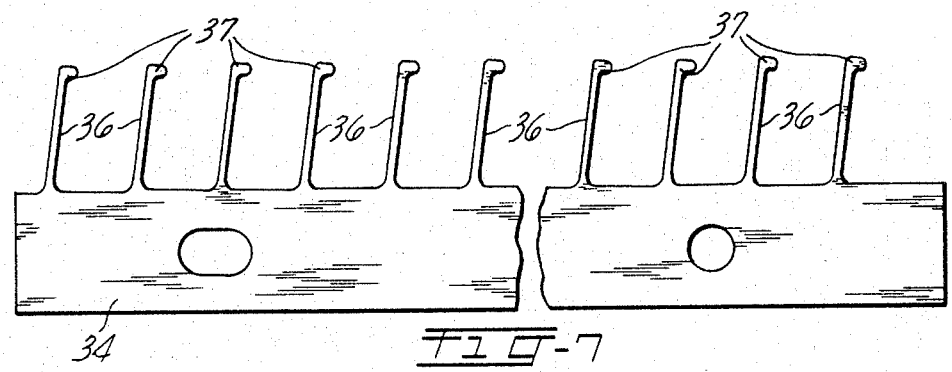

July 8, 1969    J. R. BIPPUS    3,453,989
APPARATUS FOR HOLDING ARTICLES
Filed Nov. 13, 1967    Sheet 3 of 5
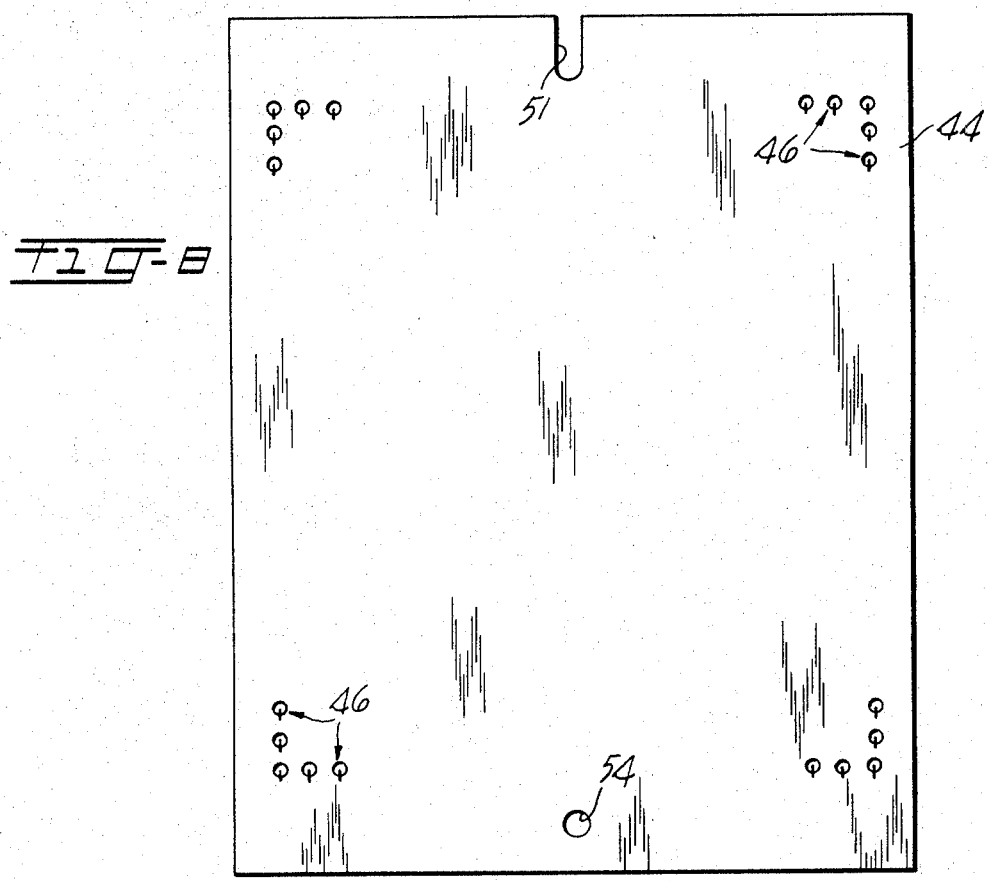
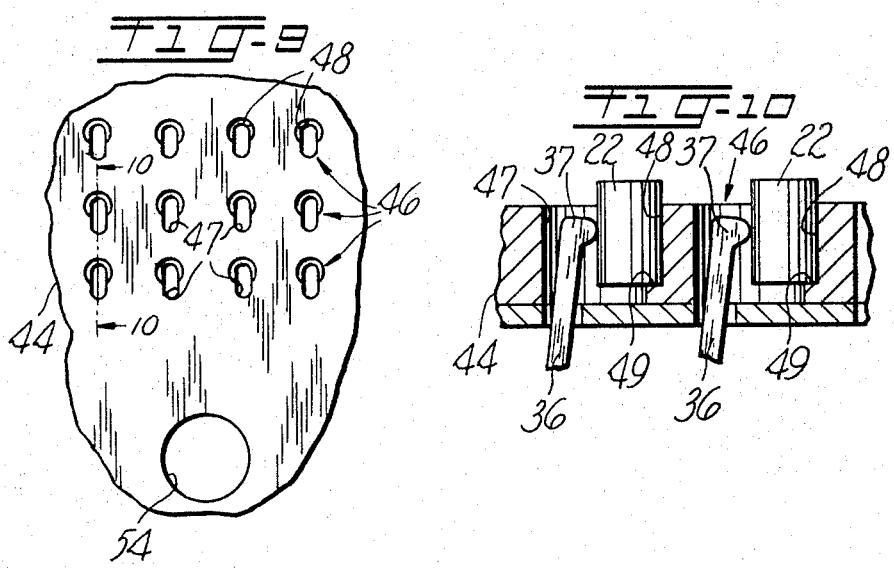

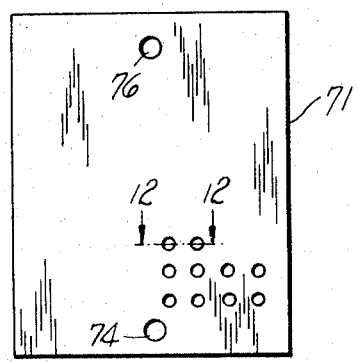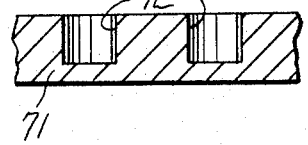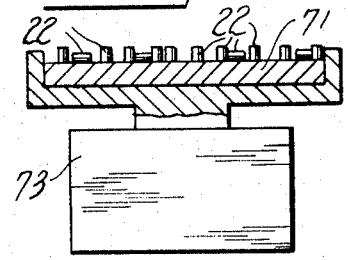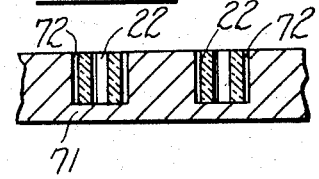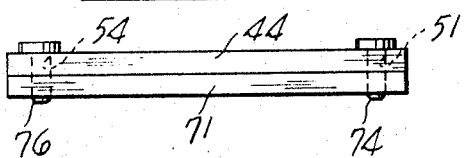

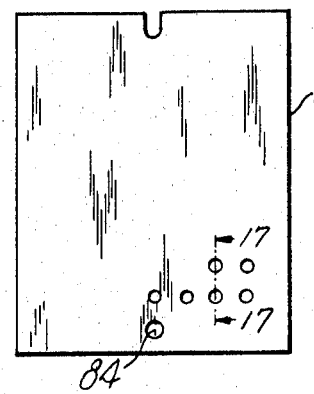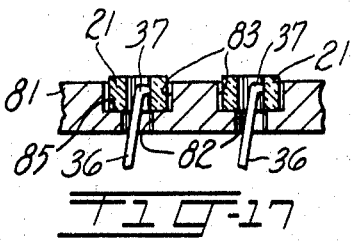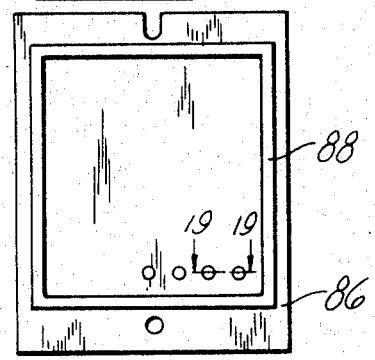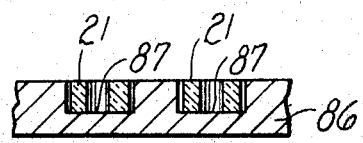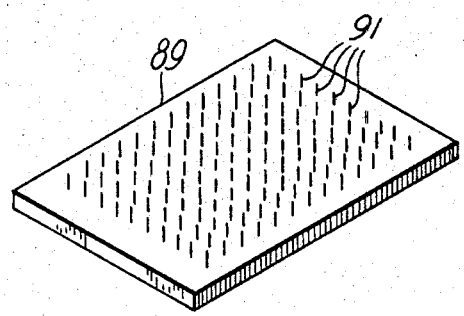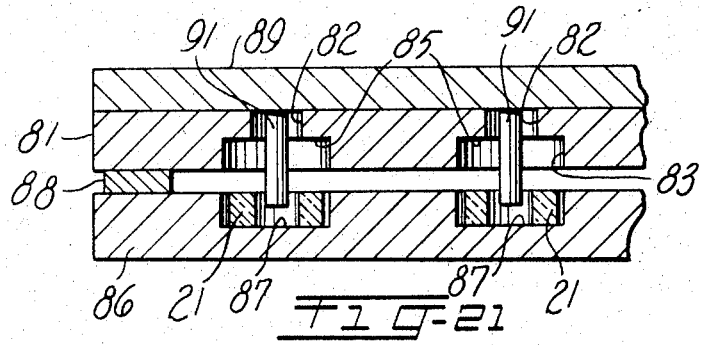

United States Patent Office 3,453,989
Patented July 8, 1969

3,453,989
APPARATUS FOR HOLDING ARTICLES
Jacob R. Bippus, Pittsburgh, Pa., assignor to Western Electric Company, Incorporated, New York, N.Y., a corporation of New York
Filed Nov. 13, 1967, Ser. No. 682,360
Int. Cl. B05c *11/14*
U.S. Cl. 118—503                          6 Claims

ABSTRACT OF THE DISCLOSURE

Small ceramic toroidal cores are resiliently gripped internally or externally by moving an apertured tray of cores relative to an array of stationary spring fingers. Auxiliary apertured transfer and guide pin plates are utilized to reverse the positions of the cores in the tray. Upon each positioning of the cores, a coating of metallic slurry is applied to projecting, exposed ends of the cores.

Field of the invention

This invention relates to an apparatus for holding articles, and more particularly, to an apparatus for supporting and resiliently holding a plurality of different size articles

Background of the invention

In the manufacture of several types of semi-conductor diodes and other electronic devices, insulating toroidal cores are used as support members for other components. Inasmuch as these cores are made of insulating material, it is not readily feasible to directly bond or braze the cores to the other metallic components. However, if the ends of the cores are provided with sintered metal layers and then nickel plated, bonding the other metallic elements then becomes possible. Heretofore, the metallizing of the ceramic cores has been accomplished on individual piece part basis or by using methods and apparatus requiring a considerable amount of individual piece part loading and unloading operations.

It is thus an object of the present invention to provide an apparatus that may be utilized to handle and metallize the opposite ends of large batches of ceramic cores. It is desirous to load the cores into relatively shallow bores formed in a handling plate or tray so that the ends of cores extend from the handling plate to allow for the application of a metallizing slurry. With the cores so extended, it is possible to apply the metallizing slurry through the agency of a silk screening process. The apparatus provided must also be capable of reversing the position of the cores in the handling plate so that both ends of the cores receive an application of the metallizing slurry. When both ends receive the slurry, the slurry is dried and the plate may then be placed in a furnace to sinter the metals to the ends of the ceramic cores.

Any such apparatus for metallizing the cores should incorporate expedients that reduce or eliminate handling of individual cores. Further, the apparatus must be versatile enough to accommodate different size cores without utilization of a number of different holding fixtures and screening devices. In addition, the apparatus should insure uniform metallization of the ends of the cores.

Summary of the invention

Toroidal cores are loaded into an array of apertures formed in a tray and then the loaded tray is positioned on a fixture which is actuated to shift the tray relative to a similar array of spring fingers that engage and exert a holding force against either the inner or outer peripheral surfaces of the cores. In order to initially load or invert the positions of the cores in the tray, auxiliary transfer and guide pin plates are utilized so that the cores are loaded and then inverted without canting or damaging the cores. Following each successive positioning of the tray and the fixture, the projecting ends of the cores are coated with a metallizing slurry squeegeed through a screen that is placed over the fixture.

Brief description of the drawing

FIGURES 1 and 2 are perspective views, respectively, of short and long toroidal ceramic cores that are to be coated utilizing the apparatus of the present invention;

FIGURE 3 is a cross-sectional view of a diode assembly illustrating the utility of the cores shown in FIGURES 1 and 2;

FIGURE 4 is a top plan view, partially cut away, of apparatus that is utilized to hold either of the cores shown in FIGURES 1 or 2 while receiving a metallizing coating;

FIGURE 5 is a sectional view taken along lines 5—5 of FIGURE 4 showing a mechanism for shifting a tray loaded with cores into a locking or holding position;

FIGURE 6 is a sectional view taken along lines 6—6 of FIGURE 4 illustrating the mounting of spring fingers that are utilized to lock the cores in the tray;

FIGURE 7 is a side elevational view of one group of spring fingers and a common support for the fingers;

FIGURE 8 is a plan view of the tray that is utilized to receive a load of cores such as shown in FIGURE 2;

FIGURE 9 is an enlarged fragmentary view of a top portion of the tray shown in FIGURE 8 illustrating the configuration of openings formed therein to receive the cores;

FIGURE 10 is a partial section view taken along lines 10—10 of FIGURE 8 showing the long cores being held by the spring fingers in the tray;

FIGURE 11 is a top plan view of a plate that is utilized to load the long cores prior to transfer into the tray;

FIGURE 12 is a partial section view, greatly enlarged, taken along lines 12—12 of FIGURE 11 showing the bores formed in the plate to receive the long cores;

FIGURE 13 is a sectional view of a vibrator apparatus that may be utilized to load the cores into the plate shown in FIGURES 11 and 12;

FIGURE 14 is a partial sectional view similar to FIGURE 12 showing the cores loaded into the plate;

FIGURE 15 depicts the manner of positioning the initial loading plate with respect to the tray in anticipation of transferring the cores into the tray;

FIGURE 16 is a top plan view of a tray that is to be loaded with the short cores shown in FIGURE 1;

FIGURE 17 is a partial sectional view, greatly enlarged, taken along lines 17—17 of FIGURE 16 showing the construction of the bores in the tray to receive the short cores;

FIGURE 18 is a top plan view of a plate that is initially loaded with the short cores in anticipation of transferring the cores to the tray shown in FIGURES 16 and 17;

FIGURE 19 is a partial sectional view, greatly enlarged, taken along lines 19—19 of FIGURE 18 illustrating the bores formed in this plate to receive the short cores;

FIGURE 20 is a perspective view of a guide pin plate that may be utilized to facilitate the transfer of the cores from the plate shown in FIGURES 18 and 19 to the tray shown in FIGURES 16 and 17;

FIGURE 21 is a partial sectional view of the assembled loaded plate, tray and guide pin plate prior to inverting to effectuate transfer of the cores from the plate into the tray.

Referring to FIGS. 1 and 2, there are shown a pair of ceramic toroidal cores 21 and 22, one short and one long, the ends of which are to be metallized. The cores may be loaded and held in position by use of the apparatus of the present invention. These cores find particular utility in the manufacture of diodes such as shown in FIG. 3 where the short core 21 provides a spacer dielectric housing bonded between a metallic base 23 and a metallic dome contact 24. The base includes a pedestal 25 for supporting a diode wafer 26 that engages the dome contact. A metallic cap 27 is bonded to the dome contact to complete the diode assembly. Terminations to other circuit elements may be made through engagement with the metallic cap 27 and base 23. The core 21 is provided at each end with a sintered metal powder layer 28 derived from a mixture of molybdenum and manganese. These metallic layers 28 permit the bonding or brazing of the base and dome contact to the ceramic core. In order to mass produce the diodes, it is necessary to provide facilities for holding masses of the cores 21 or 22 in position while silk screening a molybdenum-manganese slurry on both ends of the cores. These cores are of such small dimension that manual holding, manipulating and coating are not economically feasible.

Referring now to FIGS. 4, 5 and 6 for a consideration of a work holding apparatus 30 that may be interchangeably utilized to hold either the short core 21 or the long core 22, this apparatus includes a base 31 machined to provide projecting, parallel gibs 32. Positioned between the gibs 32 is a group of spacer holding slats 33. Interposed between the slats 33 and the gibs 32 are spring metal stampings 34 (see also FIG. 7), each having a slightly canted group of projecting spring fingers 36 terminating in core engaging lobes 37. The slats 33 and the spring metal stampings 34 are secured to the gibs 32 by lock pins 38 to provide a projecting coordinate array of spring fingers. Attached to the left- and right-hand outer gibs is a pair of guide bars 41 and 42 for supporting a stainless steel screen 43 which is positioned to overlie a removable holding tray 44 (see also FIG. 8) having a plurality of openings 46 to receive long cores 22. The tray 44 is supported on a cover shield 45 which is lying on the tops of the gibs 32. This cover shield 45 is suitably apertured so that the spring fingers 36 project therethrough and into the openings 46.

The configuration of the openings 46 in the tray 44 is more clearly illustrated in FIGS. 8, 9 and 10. Each opening 46 is formed by a slot 47 extending completely through the tray 44 and an intersecting, circular bore 48 which extends partially through the plate 44 to form a ledge 49 on which the core 22 is seated so that the upper end extends beyond the surface of the tray.

The tray, when loaded with cores 22, is positioned on the work holding apparatus 30 so that a guide slot 51 spans a guide pin 52 (see FIG. 4) extending from a bracket 53 attached to the rear end of the base 31. The tray 44 has a shift bore 54 (see FIGS. 5 and 8) which is fitted over a shift pin 56. When the tray is so positioned, the spring fingers 36 extend into the slots 47 so that the lobes 37 are positioned adjacent the outer periphery of cores 22 loaded in bores 48. When the shift pin 56 is moved, the tray is shifted to advance the cores 22 into engagement with the lobes of the stationary spring fingers 36. The cores 22 are thus resiliently locked within the bores 48 and on the ledges 49. The canted orientation of the spring fingers helps insure that the cores are held within the bores and against the ledges.

Referring to FIGS. 4 and 5, there is shown a mechanism for moving the shift pin 56. This mechanism is mounted in a housing block 61 having a slot 62 to receive a slide block 63 on which the shift pin 56 is secured. The block 63 has a threaded bore 64 to receive a set screw 66 which may be adjusted to extend beyond the block 63 and abut an end of a center gib 32' to thus establish the rest position of the shift pin 56. The shift pin 56 and the slide block 63 may be moved by turning a knurled head 67 of a screw 68 extending into the threaded bore 64. In order to facilitate turning the knurled head, a slot may be formed in the head to receive an Allen wrench. The screw 68 extends through a bore 69 formed in a support block 71 having a section secured within the left end of the slot 62 (as viewed in FIG. 5).

Both the slide block 63 and the fixed support block 71 are recessed to receive a compressed coil spring 72 that urges the slide block to move toward the right and abut the set screw 66 to an end of the center gib 32'.

In operation of the apparatus, assume that a loaded tray 44 is positioned on the work holding apparatus (see FIGS. 5 and 6) with the shift pin 56 projecting into the bore 54 and the spring fingers 36 projecting into the slots 47 so that the lobes 37 are adjacent the peripheries of the cores 22 positioned within bores 48. The knurled head 67 is turned and the screw 68 moves the slide block 63 toward the left against the action of the compression spring 72. This movement of the slide block 63 is imparted through the pin 56 to shift the tray 44 relative to the spring fingers 36 and as a result, the lobes 37 engage the cores and flex the spring fingers 36. The cores are new resiliently locked within the bores 48 (see FIG. 10) and against the ledges 49 so that the screen 43 may be placed on the guide bars 41 and 42 and be slightly spaced from the top of the cores 22 projecting from the tray 44. A slurry mixture of molybdenum and manganese is then squeegeed through the screen 43 to coat the ends of the cores 22. After drying, the cores may then be reversed in the bores 48 and the squeegee process repeated to coat opposite ends of the cores. The tray 44 is removed and placed in a sintering furnace to sinter the molybdenum-manganese slurry to form the metal terminations which may be then nickel plated and brazed to the base 23 and the dome contact 24 of the diode assembly shown in FIG. 3.

The method of loading the tray 44 contemplates the use of a transfer plate 71 such as shown in FIGS. 11 and 12. The tray 44 cannot be directly and easily loaded by use of a vibratory unit because the cores may cock in the slotted bores 46 or bounce out due to the bores relatively shallow depth. The transfer plate 71 is thus provided and has blind bores 72, the depths of which are slightly greater or equal to the length of the cores 22. First, the transfer plate 71 is placed on a commercial vibratory unit 73 (see FIG. 13) with the bores 72 exposed. A supply of cores 22 is deposited on the top of the transfer plate. Upon operation of the vibratory unit, the cores are moved about the surface and drop into the bores 72 and are seated in the manner illustrated in FIG. 14.

Next a tray 44 is inverted and placed on top of the loaded transfer plate 71 as shown in FIG. 15. Suitable guide pins are placed through apertures 74 and 76 formed in the transfer plate 71 and on through the bore 54 and the guide slot 51 to align the bores 48 with the bores 72. This assemblage is inverted and tapped to facilitate the transfer of the cores from the bores 72 into the bores 48. The loaded tray 44 may now be placed in the work holding apparatus 30 to coat the exposed ends of the cores. Upon completion of this first coating operation, the tray is removed and the slurry coating is dried. Thereafter, the cores are transferred to a second tray identical to tray 44. This second tray is merely placed on the first tray with the bores therein aligned with the bores 46. The assemblage is then inverted and tapped to transfer the cores onto the second tray whereafter the now exposed ends of the cores are coated with the slurry mixture. Upon completion of this coating operation, the cores are dried, and the fixture is placed in a furnace to sinter the dried slurry mixture to the cores.

In use of the work holding apparatus 30 with the short cores 21, a different holding tray 81 (see FIGS. 16 and 17) is utilized. This tray is provided with bores 82 and counterbores 83, the junctions of which form ledges 85 for supporting the short cores with the upper ends projecting beyond the top surface of this tray. In this instance, a shift bore 84 is formed in the tray 81 so that when the tray is positioned on the work holding apparatus 30, the shift pin 56 locates the bores 82 coaxially with respect to the lobes 37 of the spring fingers 36 in the manner shown in FIG. 17. Now the turning of the knurled head 67 and screw 68 again shifts the tray 81 to move the centers of the toroidal cores 21 against the lobes 37 to deflect the canted spring fingers 36. With the cores 21 resiliently locked in the counterbores 83 and against the ledges 85, the stretched screen 43 is placed over the guide bars 41 and 42 to provide a small space between the tops of the cores 21 and the bottom of the screen. Again, a slurry metallizing mixture is applied to the exposed ends of the cores 21.

Inasmuch as the cores are much wider than their lengths, the tray 81 cannot be directly loaded by use of a vibratory unit. If an attempt were made to directly load the tray 81, the bores would tend to cock in canted positions within the counterbores 83. Further, the cores would tend to rotate in the shallow counterbores 83, thus precluding proper seating in the bottom of the counterbores.

In order to effectuate a loading of the tray 81, a second transfer plate 86 (FIG. 18) is initially loaded. This transfer plate has a coordinate array of blind, flat bottom bores 87 (see FIG. 19), the depths of which are sufficient so that the cores are seated with their upper ends below the upper surface of the plate 86. The transfer plate 86 is placed on a vibratory unit and a supply of cores 21 is deposited on the top surface of this plate. Upon operation of the vibratory unit, the cores move along the surface and drop into the bores 87 so that the bottom surfaces of the cores 21 are seated flush with the bottom surfaces of the bores 87.

Upon filling all the bores 87, the transfer plate 86 is removed from the vibratory unit. The empty tray 81 is inverted and placed over the loaded transfer plate 86 and rests on a removable, rectangular spacer frame 88. The spacer frame 88 extends about the periphery of the transfer plate 86 and precludes contact between the tops of the cores 21 and the tray 81, thus facilitating the positioning and aligning of the bores 83 over the cores. A guide pin plate 89 (see FIG. 20) having a coordinate array of projecting guide pins 91 is inverted and placed over the tray 81 so that the ends of the pins 91 extend through the bores 82, through the counterbores 83, and into the toroidal cores 21 as shown in FIG. 21. Now, the assemblage of the tray 81, the spacer frame 88, the guide pin plate 89 and the transfer plate 86 are inverted and tapped. The cores 21 are guided along the pins 91 into the counterbores 83. The cores 21 are seated flush with the ledges 85 so that the tops of the cores extend beyond the upper surface of the tray 81.

The guide pin plate 89, the spacer frame 88 and the transfer plate 86 are removed and the loaded tray 81 is placed on the work holding apparatus 30. The shift pin 56 passes through the bore 84 to position the tray so that the lobbed ends of the springs 36 move coaxially within the toroidal cores 21 (again see FIG. 17). The knurled head 67 and screw 68 are turned to move the shift pin and the tray 81 whereuopn the cores 21 are moved against the lobes 37 to deflect the spring fingers 36 and thereby resiliently lock the cores 21 within the counterbores 83 and against the ledges 85. The stretched screen 43 is again placed over the guide bars 41 and 42 so that the bottom of the screen is slightly spaced from the projecting tops of the cores 21. Metallizing slurry is again squeegeed through the screen to coat the exposed ends of the cores 21.

In order to coat the other ends of the cores 21, the tray 81 is removed from the work holding apparatus 30. The coating is dried. A second tray, identical to tray 81, is inverted and placed on top of the again positioned spacer frame 88 and the tray 81. The pin plate 89 is positioned to pass the pins 91 through the bores in the second tray and the toroidal cores 21. The assemblage of trays and the pin plate are inverted. The pins 91 again guide the cores into the counterbores formed in the second tray. The first tray, the spacer frame 88 and the pin plate 89 are removed leaving cores loaded and seated in the bores of the second tray. The loaded second tray is placed in the work holding apparatus 30 and shifted relative to the spring fingers, whereafter the slurry mixture is applied to exposed ends of the cores 21 in a manner previously described. This coating is dried so that now both ends of the cores are provided with metallic coatings which can be subsequently sintered in a furnace.

The above-described methods and construction of apparatus are merely illustrative of the principles of the invention and many other changes may be made without departing from the invention.

What is claimed is:

1. An apparatus for resiliently holding an array of cores;
   a tray having a plurality of openings therethrough and ledges projecting into said openings for supporting said cores;
   a plurality of spring fingers extending in canted fashion into said openings; and
   means for imparting relative movement between said fingers and said tray to resiliently engage said cores with said canted spring fingers to hold said cores within openings and against said ledges.

2. In an apparatus for holding an array of cores;
   a support tray having an array of openings therethrough, each having a ledge spaced from a top end of each opening for supporting a core;
   a plate-like member having a plurality of spring fingers projecting therefrom, each finger mounted to project into an individual one of said openings to be spaced adjacent to one of said cores;
   means mounting said support tray and plate-like member for relative movement; and
   means for imparting said relative movement between said support tray and plate-like member to effect an engagement between each of said cores and an adjacent spring finger.

3. In an apparatus as defined in claim 2 wherein;
   said tray has openings, each of which comprises a bore terminating in a ledge for receiving and supporting a core and a laterally extending slot for receiving a spring finger.

4. In an apparatus as defined in claim 2 for supporting a toroidal core, wherein;
   said tray has openings, each of which comprises a bore extending through the tray for receiving a spring finger and a counterbore terminating in a ledge for supporting said toroidal core with the spring finger projecting into the core.

5. In an apparatus as defined in claim 2 wherein said means for imparting relative movement includes;
   means engaging said support tray;
   a slide block for supporting said engaging means, said slide block having a threaded bore extending therethrough;
   a stop screw projecting from one end of said threaded bore to engage said mounting means for setting the relative rest position of said tray with respect to said fingers;
   an actuator screw also projecting from the opposite end of said threaded bore; and
   means for rotating said actuator screw to shift said engaging means and said tray to move said cores into engagement with said spring fingers.

6. In an apparatus for holding a plurality of cores;
   a tray having a plurality of openings extending from the top to the bottom surfaces thereof and ledges projecting into said openings for supporting said cores;
   a plurality of elongated spring metal stampings, each having a group of parallel canted spring fingers;
   means for mounting said spring metal stampings to project said canted fingers into said openings to positions adjacent cores supported on said ledges and canted toward said ledges; and means for shifting said tray relative to said fingers to engage said cores with said fingers whereupon said canted fingers hold and urge said cores against said ledges.

References Cited

UNITED STATES PATENTS 2,475,434 7/1949 Moss _____ 118—503 X
2,510,555 6/1950 Christie _____ 214—1 X GERALD M. FORLENZA, *Primary Examiner.*

GEORGE F. ABRAHAM, *Assistant Examiner.*

U.S. Cl. X.R.

29—203; 214—1, 301; 294—87